US011926807B2

(12) United States Patent
Her et al.

(10) Patent No.: US 11,926,807 B2
(45) Date of Patent: Mar. 12, 2024

(54) CLEANING COMPOSITION AND CLEANING METHOD USING THE SAME

(71) Applicant: ENF TECHNOLOGY CO., LTD., Yongin-si (KR)

(72) Inventors: Jun Her, Yongin-si (KR); Na Rae Yim, Yongin-si (KR); Hyun Jin Jung, Yongin-si (KR); Myung Ho Lee, Hwaseong-si (KR); Myung Geun Song, Yongin-si (KR)

(73) Assignee: ENF TECHNOLOGY CO., LTD., Yongin-si (KR)

( * ) Notice: Subject to any disclaimer, the term of this patent is extended or adjusted under 35 U.S.C. 154(b) by 102 days.

(21) Appl. No.: 17/447,640

(22) Filed: Sep. 14, 2021

(65) Prior Publication Data

US 2022/0135915 A1 May 5, 2022

(30) Foreign Application Priority Data

Oct. 30, 2020 (KR) ........................ 10-2020-0143375

(51) Int. Cl.

| | |
|---|---|
| ***C11D 3/28*** | (2006.01) |
| ***C11D 3/00*** | (2006.01) |
| ***C11D 3/04*** | (2006.01) |
| ***C11D 3/30*** | (2006.01) |
| ***C11D 3/33*** | (2006.01) |
| ***C11D 3/43*** | (2006.01) |
| ***C11D 7/32*** | (2006.01) |
| ***C11D 11/00*** | (2006.01) |

(52) U.S. Cl.

CPC ........ *C11D 11/0047* (2013.01); *C11D 3/0073* (2013.01); *C11D 3/04* (2013.01); *C11D 3/046* (2013.01); *C11D 3/28* (2013.01); *C11D 3/30* (2013.01); *C11D 3/43* (2013.01)

(58) Field of Classification Search

CPC .... C11D 3/04; C11D 3/28; C11D 3/30; C11D 3/43

USPC ....... 510/175, 176, 254, 255, 257, 264, 265, 510/266, 499, 500

See application file for complete search history.

(56) References Cited

U.S. PATENT DOCUMENTS

| | | | | |
|---|---|---|---|---|
| 3,597,353 A * | 8/1971 | Randell et al. | C23F 11/149 510/237 |
| 4,401,747 A | 8/1983 | Ward, Jr. et al. | |
| 4,403,029 A | 9/1983 | Ward, Jr. et al. | |
| 4,428,871 A | 1/1984 | Ward et al. | |
| 4,744,834 A | 5/1988 | Haq | |
| 4,770,713 A | 9/1988 | Ward | |
| 2005/0287480 A1* | 12/2005 | Takashima | G03F 7/423 510/500 |
| 2006/0094613 A1* | 5/2006 | Lee | H01L 21/02063 257/E21.255 |
| 2007/0161528 A1* | 7/2007 | Wu | C11D 7/34 510/175 |

FOREIGN PATENT DOCUMENTS

| | | | |
|---|---|---|---|
| KR | 10-2003-0035207 A | 5/2003 | |
| WO | WO-2015004567 A2 * | 1/2015 | C09G 1/00 |
| WO | WO-2016161072 A1 * | 10/2016 | C11D 11/00 |
| WO | WO-2019110681 A1 * | 6/2019 | C11D 11/0047 |

* cited by examiner

*Primary Examiner* — Gregory R Delcotto

(74) *Attorney, Agent, or Firm* — Knobbe Martens Olson & Bear LLP

(57) ABSTRACT

A cleaning composition for removing post-etch or post-ash residues from a semiconductor substrate, and a cleaning method using the same are disclosed. The cleaning composition can comprise water; a fluorine compound; an alkanolamine compound; and a corrosion inhibitor. The corrosion inhibitor is a mixture of a first corrosion inhibitor and a second corrosion inhibitor. When using the cleaning composition, it is possible to efficiently remove the residues of various aspects existing on a surface of the substrate or the semiconductor device without damage to a substrate or a semiconductor device including various metal layers, insulating layers, etc. Accordingly, when a highly integrated and miniaturized semiconductor device is manufactured, it may be advantageously applied to the removal of residues generated on the surface of the substrate or the semiconductor device.

15 Claims, No Drawings

CLEANING COMPOSITION AND CLEANING METHOD USING THE SAME

CROSS-REFERENCE TO RELATED APPLICATIONS

This application claims priority under 35 U.S.C. § 119 to Korean Patent Application No. 10-2020-0143375, filed on Oct. 30, 2020, in the Korean Intellectual Property Office, the disclosure of which is incorporated herein by reference in its entirety.

TECHNICAL FIELD

The following disclosure relates to a cleaning composition for removing post-etch or post-ash residues from a semiconductor substrate, and a cleaning method using the same.

BACKGROUND

In the manufacture of a semiconductor device, a photolithography technique using a photoresist has been widely used in order to form a via hole or a contact hole for interconnection between a conductive metal wiring pattern or a patterned wiring. In order to form a metal wiring, a via hole, or a contact hole on a semiconductor substrate using photolithography, a process of 1) forming a predetermined photoresist pattern on a layer to be etched, 2) obtaining a pattern or a via hole through an etching process such as plasma etching, reactive ion etching (RIE), or ion milling using the photoresist pattern as a contact mask, and 3) removing the photoresist, which is the mask, by oxygen plasma etching is performed.

Meanwhile, an etching gas used in plasma etching and reactive ion etching which is currently widely used interacts with the layer to be etched made of aluminum, tungsten, titanium, etc., or the photoresist used as the contact mask in the etching process, resulting in by-products such as organometallic materials and sidewall polymer materials. The by-products called a sidewall polymer, a veil, a fence, etc., remain on a substrate even after oxygen plasma asking. The by-products are not completely removed even with organic solvents such as pyrrolidone, dimethylsulfone, methylene chloride, dimethylformamide, or dimethylacetamide. These by-products contaminate a surface of the substrate or the semiconductor device, which causes a hindrance to the subsequent process. That is, these by-products may not only reduce process efficiency, but also cause fatal problems in reliability and functions of highly integrated and miniaturized semiconductor devices. Therefore, a study on a cleaning agent and a cleaning method capable of substantially completely removing these by-products has been actively conducted.

The following documents disclose the related technology.

(Patent Document 1) U.S. Pat. No. 4,770,713 A (Patent Document 2) U.S. Pat. No. 4,403,029 A (Patent Document 3) U.S. Pat. No. 4,428,871 A (Patent Document 4) U.S. Pat. No. 4,401,747 A (Patent Document 5) U.S. Pat. No. 4,744,834 A (Patent Document 6) KR 10-2003-0035207 A The disclosure of this section is to provide background information relating to the present disclosure. Applicant does not admit that any information contained in this section constitutes prior art.

SUMMARY

An embodiment of the present invention is directed to providing a cleaning composition capable of efficiently removing post-etch or post-ash residues from a semiconductor substrate, and a cleaning method using the same.

Another embodiment of the present invention is directed to providing a cleaning composition that does not cause damage to a surface of an object to be cleaned and does not leave residues on the surface of the object to be cleaned, and a cleaning method using the same.

Still another embodiment of the present invention is directed to providing a method of manufacturing a semiconductor device for providing a semiconductor device having excellent performance with a high process yield by effectively removing residues present on a surface of an object to be cleaned.

In one general aspect, there is provided a cleaning composition containing: water; a fluorine compound; an alkanolamine compound; and a corrosion inhibitor, wherein the corrosion inhibitor is a mixture of a first corrosion inhibitor represented by the following Formula 1 and a second corrosion inhibitor represented by the following Formula 2:

[Formula 1]

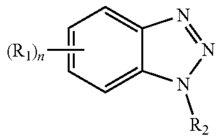

[Formula 2]

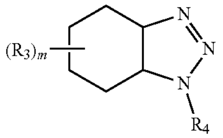

wherein $R_1$ and $R_3$ are each independently halogen, amino, hydroxy, cyano, nitro, a carboxyl group, $C_{1-20}$ alkoxy, $C_{1-20}$ alkyl, or $C_{1-20}$ aminoalkyl;

$R_2$ and $R_4$ are each independently hydrogen or $C_{1-20}$ alkyl; and n and m are each independently an integer selected from 0 to 4.

In Formulas 1 and 2, $R_1$ and $R_3$ may be each independently halogen, amino, hydroxy, cyano, nitro, a carboxyl group, $C_{1-7}$ alkoxy, $C_{1-7}$ alkyl, or $C_{2-7}$ aminoalkyl; $R_2$ and $R_4$ may be each independently hydrogen or $C_{1-7}$ alkyl; and n and m may be each independently an integer of 0 or 1.

In Formulas 1 and 2, $R_1$ and $R_3$ may be each independently $C_{1-7}$ alkyl; $R_2$ and $R_4$ may be each independently hydrogen or $C_{1-7}$ alkyl; and n and m may be integers of 1.

The corrosion inhibitor may be a mixture mixed with 0.1 to 10 parts by weight of the second corrosion inhibitor, based on 1 part by weight of the first corrosion inhibitor.

The cleaning composition may have a pH of 7 to 14.

The cleaning composition may be for removing post-etch or post-ash residues from a substrate used in the semiconductor industry.

The post-etch or post-ash residues may be selected from a polymer compound, an aluminum-containing compound, a copper-containing compound, a tungsten-containing compound, a cobalt-containing compound, a titanium-containing compound, and combinations thereof.

The fluorine compound may contain ammonium fluoride.

In another general aspect, there is provided a cleaning method of a semiconductor substrate using the cleaning composition as described above.

The cleaning method of a semiconductor substrate may include a cleaning step of bringing the cleaning composition as described above into contact with a surface of the substrate on which post-etch or post-ash residues are present.

The cleaning method of a semiconductor substrate may include a cleaning step of bringing the cleaning composition as described above into contact with a surface of the substrate on which photoresist polymer residues are present.

The cleaning step may be performed in the range of 25 to 70° C.

The semiconductor substrate may include a metal layer containing a metal selected from aluminum (Al), copper (Cu), tungsten (W), cobalt (Co), and titanium (Ti).

In another general aspect, there is provided a method for manufacturing a semiconductor device, including the cleaning method of a semiconductor substrate as described above.

Other features and aspects will be apparent from the following detailed description and the claims.

DETAILED DESCRIPTION OF EMBODIMENTS

The cleaning composition for removing post-etch or post-ash residues from the semiconductor substrate according to embodiments of the present invention and the cleaning method using the same will be described in detail below, but technical terms and scientific terms used herein have the general meaning understood by those skilled in the art to which the present invention pertains unless otherwise defined, and a description for the known function and configuration obscuring the present invention will be omitted in the following description.

Further, singular forms used herein are intended to include the plural forms as well unless otherwise indicated in context.

In addition, units used herein are based on weight, unless otherwise specified. For example, the unit of % or ratio means % by weight or ration by weight, and % by weight means % by weight of any one component in the total composition, unless otherwise defined.

In addition, numerical ranges used herein include a lower limit, an upper limit, and all values within these ranges, increments that are logically derived from the type and width of the defined range, all double-defined values, and all possible combinations of upper and lower limits of numerical ranges defined in different forms. Unless otherwise defined herein, values outside the numerical range that may arise due to experimental error or rounded values are also included in the defined numerical range.

As used herein, the term “comprise” is an “open” description having the meaning equivalent to expressions such as “include,” “contain,” “have,” or “feature”, and does not exclude elements, materials, or process that are not further listed.

In addition, as used herein, the term “substantially” means that other elements, materials, or processes not listed with the specified element, material or process may be present in an amount or degree that does not have an unacceptably significant effect on at least one basic and novel technical idea of the invention.

As used herein, the term “residues” may by-products generated after etching or asking from a substrate used in the semiconductor industry, and may mean contaminant particles or contaminant layers containing organic or inorganic materials that may be present on the substrate after the process.

As used herein, the term “dishing” is an aspect of surface defects generated in metal wiring, and refers to a form of corrosion in which the metal wiring is corroded and generated in the form of a plate.

As used herein, the term “alkyl”, “alkoxy” or a substituent including an alkyl group includes both linear and branched-chain types.

As used herein, the term “halogen” refers to a fluorine, chlorine, bromine, or iodine atom.

As used herein, the term “aminoalkyl” refers to an alkyl group including an amino group (*—NR'R"). Here, R' and R" are each independently hydrogen or $C_{1-20}$ alkyl.

As used herein, the term “carboxyl group” refers to *—COOH.

In one example, a cleaning composition consists of a mixture of dimethylformamide, alkanolamine, etc. In another example, a cleaning composition consists of a mixture of 2-pyrrolidone, dialkylsulfone, alkanolamine, etc. Still in another example, a cleaning composition consists of 2-pyrrolidone and tetramethylammonium hydroxide. However, a life-time of the foregoing cleaning compositions is short because a high temperature is required to remove the sidewall polymer using these cleaning compositions.

As a further example, a cleaning composition contains ammonia water, hydrofluoric acid, acetic acid, and water, and having a pH of 7 to 12. However, when the cleaning composition disclosed is used for an alloy of an aluminum-containing metal or an active metal such as aluminum or titanium, and an amphoteric metal such as copper or tungsten, a corrosion of the metal is caused by a reaction between an alkaline cleaning composition and the metal.

Thus, in a substrate or a semiconductor device including a metal layer containing various metals such as aluminum, titanium, tungsten, copper, or cobalt, or an insulating film containing silicon oxide, etc., in the art, there is an urgent need for the development of a cleaning composition and a cleaning method capable of efficiently removing residues present on a surface of the substrate or the semiconductor device without damaging to the surface.

A typical cleaning composition had disadvantages of causing unnecessary etching of the metal layer or the insulating layer or corrosion of the metal layer. In order to solve the foregoing, a composition having various additives has been proposed, but these additives interact with the residues to adversely affect a solubility of the residues in the cleaning composition, or even after cleaning is completed, the composition is not easily cleaned from a surface to be cleaned.

Accordingly, the present inventors confirmed that a cleaning power for residues present on a surface of a substrate after etching or asking from the substrate used in a semiconductor industry may be extremely improved when a combination of a cyclic amine-based corrosion inhibitor is employed, by repeatedly conducting studies. In addition, the present inventors also confirmed that corrosion of or damage to a metal layer or an insulating layer included in a general semiconductor substrate may be prevented when the combination of the cyclic amine-based corrosion inhibitor is employed, and have proposed embodiments of the present invention.

Hereinafter, embodiments of the present invention will be described in detail.

The cleaning composition according to embodiments of the present invention contains a mixture of a first corrosion inhibitor represented by the following Formula 1 and a second corrosion inhibitor represented by the following Formula 2.

Specifically, the cleaning composition according to an embodiment of the present invention may contain water; a fluorine compound; an alkanolamine compound; and a corrosion inhibitor of the above-mentioned combination:

[Formula 1]

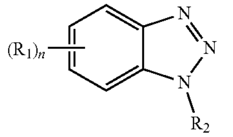

[Formula 2]

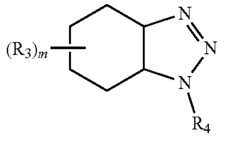

wherein $R_1$ and $R_3$ are each independently halogen, amino, hydroxy, cyano, nitro, a carboxyl group, $C_{1-20}$ alkoxy, $C_{1-20}$ alkyl, or $C_{1-20}$ aminoalkyl;

$R_2$ and $R_4$ are each independently hydrogen or $C_{1-20}$ alkyl; and n and m are each independently an integer selected from 0 to 4

In the cleaning composition according to an embodiment of the present invention, in Formulas 1 and 2, $R_1$ and $R_3$ may be each independently halogen, amino, hydroxy, cyano, nitro, a carboxyl group, $C_{1-7}$ alkoxy, $C_{1-7}$ alkyl, or $C_{2-7}$ aminoalkyl; $R_2$ and $R_4$ may be each independently hydrogen or $C_{1-7}$ alkyl; and n and m may be each independently an integer of 0 or 1.

For example, in Formulas 1 and 2, $R_1$ and $R_3$ may be each independently halogen, hydroxy or a carboxyl group; $R_2$ and $R_4$ may be each independently hydrogen or $C_{1-7}$ alkyl; and n and m may be integers of 1.

For example, in Formulas 1 and 2, $R_1$ and $R_3$ may be each independently $C_{1-7}$ alkyl or $C_{2-7}$ aminoalkyl; $R_2$ and $R_4$ may be each independently hydrogen or $C_{1-7}$ alkyl; and n and m may be each independently an integer of 0 or 1.

In the cleaning composition according to an embodiment of the present invention, in Formulas 1 and 2, $R_1$ and $R_3$ may be each independently $C_{1-7}$ alkyl; $R_2$ and $R_4$ may be each independently hydrogen or alkyl; and n and m may be integers of 1.

For example, in Formulas 1 and 2, $R_1$ and $R_3$ may be each independently $C_{1-4}$ alkyl; $R_2$ and $R_4$ may be each independently hydrogen or $C_{1-4}$ alkyl; and n and m may be integers of 1.

For example, in Formulas 1 and 2, $R_1$ and $R_3$ may be each independently a linear $C_{1-3}$ alkyl; $R_2$ and $R_4$ may be each independently hydrogen or a linear $C_{1-3}$ alkyl; and n and m may be integers of 1.

For example, in Formulas 1 and 2, $R_1$ and $R_3$ may both be methyl or ethyl.

The first corrosion inhibitor may include, but is not limited to, benzotriazole, 5-aminobenzotriazole, 1-hydroxybenzotriazole, 5-chlorobenzotriazole, 4-chlorobenzotriazole, 5-bromobenzotriazole, 4-bromobenzotriazole, 5-fluorobenzotriazole, 4-fluorobenzotriazole, tolyltriazole, 5-nitrobenzotriazole, 4-nitrobenzotriazole, 1-amino-benzotriazole, benzotriazole-5-carboxylic acid, 4-methylbenzotriazole, 4-ethylbenzotriazole, 5-ethylbenzotriazole, 4-propylbenzotriazole, 5-propylbenzotriazole, 4-isopropylbenzotriazole, 5-isopropylbenzotriazole, 4-n-butylbenzotriazole, 5-n-butylbenzotriazole, 4-isobutylbenzotriazole, 5-isobutylbenzotriazole, 4-pentylbenzotriazole, 5-pentylbenzotriazole, 4-hexylbenzotriazole, 5-hexylbenzotriazole, 5-methoxybenzotriazole, 5-hydroxybenzotriazole, dihydroxypropylbenzotriazole, 1-[N,N-bis(2-ethylhexyl) aminomethyl]-benzotriazole, 5-t-butylbenzotriazole, 5-(1',1'-dimethylpropyl)-benzotriazole, 5-(1',1',3'-trimethylbutyl) benzotriazole, 5-n-octyl benzotriazole, and 5-(1',1',3',3'-tetramethylbutyl)benzotriazole, and may be one or two or more selected from them.

The second corrosion inhibitor may include, but is not limited to, 4,5,6,7-tetrahydro-1H-benzotriazole, 5-methyl-4,5,6,7-tetrahydro-1H-benzotriazole, 6-methyl-4,5,6,7-tetrahydro-1H-benzotriazole, 5,6-dimethyl-4,5,6,7-tetrahydro-1H-benzotriazole, and 4,6-dimethyl-4,5,6,7-tetrahydro-1H-benzotriazole, and may be one or two or more selected from them.

A cleaning composition containing an alkanolamine compound and a hydroxylamine compound has a high etch rate to a metal (e.g., aluminum, etc.) used as a metal wiring material, so that there is a high probability that a dishing phenomenon will occur in the metal wiring. However, the dishing phenomenon may be significantly suppressed by adjusting the etch rate of the metal layer comprising aluminum, using the corrosion inhibitor of the above-mentioned combination. In particular, the cleaning composition according to embodiments of the present invention exhibits excellent cleaning of residues to be cleaned without causing any damage such as corrosion, undercuts, whiskers, pitching, notching, etc., to the metal layer containing a metal selected from copper (Cu), tungsten (W), cobalt (Co), and titanium (Ti). In addition, the cleaning composition according to embodiments of the present invention may remove photoresist polymer residues in a short time.

In addition, the cleaning composition according to embodiments of the present invention exhibits a maximized corrosion inhibitory effect compared to a case where the first corrosion inhibitor or the second corrosion inhibitor is contained alone.

Accordingly, the cleaning composition according to embodiments of the present invention may be a cleaning composition for removing metal residual particles generated after etching or ashing from a substrate used in the semiconductor industry. In addition, the cleaning composition according to embodiments of the present invention may be a cleaning composition for removing an organometallic material generated after etching or ashing. Also, the cleaning composition according to embodiments of the present invention may be a cleaning composition for removing photoresist polymer residues that are sidewall polymers generated after etching or ashing.

In the cleaning composition according to an embodiment of the present invention, the post-etch or post-ash residues may be selected from a polymer compound, a copper-containing compound, a tungsten-containing compound, a cobalt-containing compound, a titanium-containing compound, and combinations thereof.

In the cleaning composition according to an embodiment of the present invention, the corrosion inhibitor may be a mixture mixed with 0.1 to 10 parts by weight of the second corrosion inhibitor, specifically 0.5 to 8 parts by weight, and more specifically 1.0 to 5 parts by weight, based on 1 part by weight of the first corrosion inhibitor.

The cleaning composition according to an embodiment of the present invention may have a pH of 7 to 14. That is, the cleaning composition may effectively remove residual metal particles, metal ions, organic materials, etc., in an alkaline pH region, and after cleaning, may stably collect metal ions, etc., within the composition to prevent metal ions from re-contaminating the substrate surface.

For example, the cleaning composition may have a pH of 8 to 12.

For example, the cleaning composition may have a pH of 9 to 11.

The water contained in the cleaning composition according to an embodiment of the present invention is not particularly limited, but may be specifically deionized water. More specifically, the deionized water is deionized water for a semiconductor process and may have a specific resistance value of 18 MΩ·cm or more.

In the cleaning composition according to an embodiment of the present invention, the alkanolamine may be an alkanolamine having 2 to 10 carbon atoms. The alkanolamine may include, but is not limited to, monoethanolamine, diethanolamine, triethanolamine, monopropanolamine, N-methyl diethanolamine, N,N-dimethylethanolamine, N-ethyl diethanolamine, N,N-diethylethanolamine, 2-(2-aminoethylamino)-1-ethanol, 1-amino-2-propanol, 2-amino-1-propanol, 3-amino-1-propanol, 4-amino-1-butanol, dibutanolamine, (methoxymethyl)diethanolamine, (hydroxyethyloxymethyl)diethylamine, methyl (methoxymethyl)aminoethanol, methyl (butoxymethyl) aminoethanol, 2-(2-aminoethoxy) ethanol, 1-(2-hydroxyethyl)piperazine, 1-(2-hydroxyethyl)methylpiperazine, N-(2-hydroxyethyl)morpholine, and N-(3-hydroxypropyl)morpholine, and, in one embodiment, may include a linear alkanolamine.

In the cleaning composition according to an embodiment of the present invention, the fluorine compound may contain ammonium fluoride ($NH_4F$).

For example, the cleaning composition may further contain hydrogen fluoride (HF), ammonium hydrogen fluoride ($NH_4HF_2$), or combinations thereof.

The cosmetic composition according to an embodiment of the present invention may include 0.001 to 5% by weight of the fluorine compound, 0.1 to 10% by weight of the alkanolamine compound, 0.001 to 5% by weight of the corrosion inhibitor, and the remaining amount of water based on the total weight of the cleaning composition. Specifically, the cosmetic composition may include 0.005 to 3% by weight of the fluorine compound, 0.5 to 8% by weight of the alkanolamine compound, 0.005 to 3% by weight of the corrosion inhibitor and the remaining amount of water, and more specifically, the 0.01 to 2% by weight of the fluorine compound, 1 to 7% by weight of the alkanolamine compound, 0.01 to 2% by weight of the corrosion inhibitor, and the remaining amount of water.

If the above-mentioned composition is satisfied, it may be preferable that the residue dissolved and cleaned in the chemical solution does not cause a phenomenon in which the residue is re-precipitated and re-adsorbed on the substrate surface to remain as a residue, and the metal layer or the insulating layer contained in the semiconductor substrate does not unnecessarily overetching or cause corrosion of the metal layer.

In addition, in the cleaning composition, the corrosion inhibitor is a mixture of the first corrosion inhibitor (A) and the second corrosion inhibitor (B), which may be mixed in a weight ratio (A:B) satisfying the range of 1:0.5 to 1:10, or 1:0.5 to 1:8, or 1:1 to 1:5.

In addition, the cleaning composition according to an embodiment of the present invention may be substantially free of additional additives selected from an oxidizing agent, an organic acid, and a quaternary organic ammonium salt.

For example, the oxidizing agent may include hydrogen peroxide, nitric acid, perchloric acid, hypochlorous acid, ammonium peroxide, boron, or iodine. The cleaning composition containing the above-mentioned oxidizing agent may not be able to completely remove contaminants such as the photoresist polymer residues, and may cause damage to the metal layer.

Examples of the quaternary organic ammonium salt may include tetramethylammonium hydroxide (TMAH), tetraethylammonium hydroxide (TEAH), tetrapropylammonium hydroxide (TPAH), tetrabutylammonium hydroxide (TBAH), benzyltrimethylammonium hydroxide (BTEAH), hydroxide Benzyltriethylammonium (BTEAH), (2-hydroxylethyl)trimethylammonium hydroxide, (2-hydroxylethyl)triethylammonium hydroxide, (2-hydroxylethyl) tripropylammonium hydroxide, (1-hydroxypropyl) trimethylammonium hydroxide, ethyltrimethylammonium hydroxide, diethyldimethylammonium hydroxide (DEDMAH), or tris(2-hydroxyethyl)methylammonium hydroxide (THEMAH). When the cleaning composition contains the above-mentioned quaternary organic ammonium salt, it may cause damage to the metal layer, and in particular, overetching or corrosion to the metal layer containing copper, cobalt, etc., which is not preferable.

Examples of the organic acid may include acetic acid, formic acid, butanoic acid, citric acid, glycolic acid, oxalic acid, malonic acid, pentanoic acid, propionic acid, tartaric acid, gluconic acid, glycolic acid, or succinic acid. When the cleaning composition contains the above-mentioned quaternary organic ammonium salt, it may cause damage to the metal layer due to deterioration of the performance of the corrosion inhibitor by lowered pH, and in particular, it may be coordinated with transition metals such as copper and cobalt to cause corrosion to the metal layer, which is not preferable.

In addition, embodiments of the present invention provide a method of cleaning a semiconductor substrate using the cleaning composition as described above and a method of manufacturing a semiconductor device including the same.

An aspect of a cleaning method of a semiconductor substrate may include a cleaning step of bringing the cleaning composition as described above into contact with a surface of the substrate on which post-etch or post-ash residues are present.

An aspect of a cleaning method of the semiconductor substrate may include a cleaning step of bringing the cleaning composition as described above into contact with the substrate including the photoresist polymer residues.

An aspect of a method of manufacturing the semiconductor device may include the above-mentioned cleaning step.

The semiconductor substrate may be used without limitation as long as it serves as a substrate, and in embodiments, may be a flexible substrate. Non-limiting examples of the semiconductor substrate may be selected from a flexible glass substrate, a silicon wafer, a plastic substrate, etc. In this case, the plastic substrate may include, but is not limited to, one or more materials selected from polyimide, polycarbonate, polyphenylene sulfide, and polyarline ether sulfone.

For example, the semiconductor substrate may include one or more underlying layers selected from a metal layer and an insulating layer.

For example, the metal layer may include a metal selected from copper (Cu), tungsten (W), cobalt (Co), and titanium (Ti). In addition, the metal layer may further include, but is not limited to, one or two or more metals selected from Ag, Mg, Pt, Pd, Au, Ni, Nd, Ir, Cr, Li, Ca, Mo, Sn, Zn, and In.

For example, the insulating layer may include one or more materials selected from amorphous silicon, polysilicon, silicon oxide, silicon nitride, etc.

According to a cleaning method of the semiconductor substrate according to an embodiment of the present invention, substantially no corrosion or damage is caused to the above-mentioned semiconductor substrate, that is, an object to be cleaned. That is, only the residues present on the object to be cleaned are selectively cleaned, and no corrosion or damage is caused to the object to be cleaned.

Specifically, according to the cleaning method of the semiconductor substrate according to an embodiment of the present invention, the cleaning composition may be applied to the semiconductor substrate on which the photoresist pattern is formed. In this case, the semiconductor substrate may be a result obtained by etching a layer to be etched using the photoresist pattern as an etching mask, and an object to be cleaned using the cleaning composition may be the semiconductor substrate. That is, the cleaning composition may clean the photoresist polymer residues. In addition, the evaluation of the cleaning power for the object to be cleaned may be based on the following criteria.

For example, the removal time of the photoresist polymer residues may be 90 seconds or less or 60 seconds or less.

The polymer included in the photoresist is not limited.

Specifically, according to the cleaning method of the semiconductor substrate according to an embodiment of the present invention, the cleaning composition may be applied to the semiconductor substrate including the metal layer. During cleaning, the etch rate for the metal layer may be 5 Å/min or less. In addition, the evaluation of no corrosion or damage to the object to be cleaned may be based on the following criteria.

For example, when the metal layer is a copper layer, the etch rate for the copper layer may be 1 Å/min or less.

For example, when the metal layer is a cobalt layer, the etch rate for the cobalt layer may be 1 Å/min or less.

For example, when the metal layer is a tungsten layer, the etch rate for the tungsten layer may be less than 5 Å/min.

For example, all of the above-mentioned criteria may be satisfied.

In addition, the etching may be a dry process, and a process of primarily removing the photoresist pattern by ashing may be further included, after etching.

In addition, the cleaning may be performed using a single type or batch type equipment.

In the cleaning method of the semiconductor substrate according to an embodiment of the present invention, the temperature at which the cleaning step is performed may vary depending on the type and state of the photoresist to be removed, but may be preferably in the range of 25 to 70° C. The cleaning step may be specifically performed in the range of 25 to 60° C., and more specifically in the range of 30 to 50° C. That is, according to embodiments of the present invention, excellent cleaning power may be implemented even under mild temperature conditions. In addition, the cleaning step may be performed by immersing the semiconductor substrate for about 10 to 60 seconds under the above-mentioned temperature conditions.

As mentioned above, according to embodiments of the present invention, it may be applied to a process of cleaning a semiconductor device or a substrate thereof during a process of manufacturing various aspects of semiconductor devices such as a high integrated circuit and an ultra high integrated circuit. Accordingly, residues generated after etching or after ashing, or the photoresist polymer residues on the sidewalls and bottoms that have been denatured and hardened, may be easily removed in a short time. In particular, the effect of inhibiting corrosion on a metal layer containing a metal selected from copper (Cu), tungsten (W), cobalt (Co), and titanium (Ti) may be maximized, and the photoresist polymer residues may be effectively removed. Accordingly, the cleaning composition according to the present invention may minimize the corrosion of the metal layer applied to semiconductor mass production line while completely removing the photoresist polymer residue, and thus may improve process yield as well as work efficiency. Further, a highly reliable semiconductor device may be provided from this.

Hereinafter, the present invention will be described in more detail based on Examples and Comparative Examples. However, the following Examples and Comparative Examples are only examples for describing the present invention in more detail, and the present invention is not limited by the following Examples and Comparative Examples. Unless otherwise stated in the application, all of the temperatures are expressed in the unit of ° C., and the amount of composition used is expressed in the unit of % by weight.

(Evaluation Method)

1. Corrosion Evaluation

Corrosion tests were performed on cleaning compositions prepared in the following Examples and Comparative Examples. Specifically, a semiconductor substrate to be subjected to the corrosion test was prepared as each silicon wafer on which a 300 Å copper layer, a 280 Å cobalt layer, and a 3000 Å silicon oxide insulating layer (TEOS film), or a 2000 Å tungsten layer was formed. Before starting etching, the thickness of each layer was measured before etching using an ellipsometer (J. A. WOOLLAM, M-2000) and X-ray fluorescence spectroscopy (XRF, EA-1000III), which are thin film thickness measuring equipments.

Thereafter, an etching temperature was maintained at 30° C. in a bath, and each semiconductor substrate was immersed in the cleaning composition prepared in the following Examples or Comparative Examples for 10 minutes and then etched. After the etching was completed, the semiconductor substrates were cleaned with ultrapure water, and then the remaining cleaning agent composition and ultrapure water were completely dried using a drying apparatus. In addition, the method was evaluated by performing 10 batches without changing the chemical solution using 1 batch.

In this case, the etch rate was calculated by dividing a difference in thickness before and after etching by the etching time (minutes) using an ellipsometer (J. A. WOOLLAM, M-2000U) and X-ray fluorescence spectroscopy (XRF, EA-1000III), and the results are shown in Table 2 below.

2. Cleaning Power Evaluation of Photoresist Polymer Residues

The removal time evaluation test of photoresist polymer residues for the cleaning compositions prepared in the following Examples and Comparative Examples was performed. Specifically, a semiconductor substrate to be subjected to the cleaning power evaluation test was prepared by the following method.

A positive resist composition [manufactured by Dongjin Semichem Co., Ltd., product name: DPR-i1000], which is universally used, was spin-coated on the surface of the semiconductor substrate to have a final thickness of 1.01 μm. Then, the resist film was pre-baked at 110° C. for 90 seconds on a hot plate. Thereafter, a mask of a predetermined pattern was placed on the resist film, irradiated with ultraviolet light, and developed with 2.38% by weight of tetramethylammonium hydroxide (TMAH) developer at 21° C. for 60 seconds to form a photoresist pattern. Then, a specimen on which the photoresist pattern was formed was hard-baked at 120° C. for 100 seconds on a hot plate. The resist pattern formed on the specimen was used as a mask, and a $Cl_2/BCl_3$ mixed gas was used as an etching gas in a dry etching apparatus (Applied Materials, model name: DPS+) to etch a lower layer of titanium nitride for EPD+45 seconds. Then, most of the photoresist was removed to complete the specimen by using an asking apparatus using $O_2$ plasma.

Thereafter, an etching temperature was maintained at 50° C. in a bath, and the specimen manufactured by the above manufacturing method was immersed in the cleaning composition prepared in the following Examples or Comparative Examples and then etched. Then, the time taken to remove the photoresist polymer residues was measured by evaluating every 30 seconds. The removal of the photoresist polymer residues was observed with a scanning electron microscope (SEM, S-4800, Hitachi), and the results are shown in Table 2 below.

Examples 1 to 7 and Comparative Examples 1 to 12

After mixing in a composition ratio shown in Table 1 below, a cleaning composition was prepared by stirring the composition at a speed of 500 rpm at room temperature (25° C.) for 5 minutes. The content of water was set as the remaining amount such that the total weight of the composition was 100% by weight.

TABLE 1

| Unit (% by weight) | Fluorine compound | | Alkanolamine | | First corrosion inhibitor | | Second corrosion inhibitor | | Additive | | | |
|---|---|---|---|---|---|---|---|---|---|---|---|---|
| | Type | Content | Type | Content | Type | Content | Type | Content | Type | Content | Water | pH |
| Example 1 | AF | 0.1 | AEE | 5 | TTA | 0.2 | MTB | 0.2 | — | — | Remaining amount | 10.5 |
| Example 2 | AF | 0.1 | MEA | 5 | TTA | 0.2 | MTB | 0.2 | — | — | Remaining amount | 10.5 |
| Example 3 | AF | 0.1 | DEA | 5 | TTA | 0.2 | MTB | 0.2 | — | — | Remaining amount | 10.5 |
| Example 4 | AF | 0.1 | AEE | 5 | TTA | 0.2 | MTB | 0.5 | — | — | Remaining amount | 10.4 |
| Example 5 | AF | 0.1 | AEE | 5 | TTA | 0.2 | MTB | 1 | — | — | Remaining amount | 10.4 |
| Example 6 | AF | 0.1 | AEE | 6 | TTA | 0.2 | MTB | 0.2 | — | — | Remaining amount | 10.6 |
| Example 7 | AF | 0.1 | AEE | 6 | TTA | 0.2 | MTB | 0.5 | — | — | Remaining amount | 10.6 |
| Comp. Example 1 | AF | 0.1 | MEA | 5 | TTA | 0.2 | — | — | — | — | Remaining amount | 10.3 |
| Comp. Example 2 | AF | 0.1 | MEA | 5 | — | — | MTB | 0.2 | — | — | Remaining amount | 10.2 |
| Comp. Example 3 | AF | 0.1 | — | — | TTA | 0.2 | MTB | 0.2 | — | — | Remaining amount | 6.5 |
| Comp. Example 4 | — | — | MEA | 5 | TTA | 0.2 | MTB | 0.2 | — | — | Remaining amount | 10.3 |
| Comp. Example 5 | AF | 0.1 | AEE | 5 | TTA | 0.2 | — | — | PZ | 0.5 | Remaining amount | 10.2 |
| Comp. Example 6 | AF | 0.1 | AEE | 5 | — | — | MTB | 0.2 | PZ | 0.5 | Remaining amount | 10.3 |
| Comp. Example 7 | AF | 0.1 | AEE | 5 | — | — | — | — | PZ | 0.5 | Remaining amount | 10.5 |
| Comp. Example 8 | AF | 0.1 | AEE | 5 | TTA | 0.2 | — | — | $H_2O_2$ | 18 | Remaining amount | 7.9 |
| Comp. Example 9 | AF | 0.1 | AEE | 5 | — | — | MTB | 0.5 | $H_2O_2$ | 18 | Remaining amount | 7.9 |
| Comp. Example 10 | AF | 0.1 | — | — | TTA | 0.2 | MTB | 0.5 | TEAH | 0.01 | Remaining amount | 10.5 |
| Comp. Example 11 | AF | 0.1 | — | — | TTA | 0.4 | MTB | 0.5 | TEAH | 0.01 | Remaining amount | 10.5 |
| Comp. Example 12 | AF | 0.1 | — | — | TTA | 0.6 | MTB | 0.5 | TEAH | 0.01 | Remaining amount | 10.5 |

AF: Ammonium fluoride
AEE: 2-(2-aminoethoxy)ethanol
TTA: Tolyltriazole
MEA: Monoethanolamine
EA: Diethanolamine
PZ: Pyrazole
TEAH: Tetraethylammonium hydroxide
MTB: 5-methyl-4,5,6,7-tetrahydro-1H-benzotriazole

TABLE 2

| | Cu etch rate (Å/min) | Co etch rate (Å/min) | W etch rate (Å/min) | TEOS etch rate (Å/min) | Polymer residue removal time (sec) |
|---|---|---|---|---|---|
| Example 1 | 0.5 | 0.5 | <3 | <1 | 60 |
| Example 2 | 0.6 | 0.6 | <3 | <1 | 60 |
| Example 3 | 0.8 | 0.8 | <3 | <1 | 60 |
| Example 4 | <0.5 | <0.5 | <3 | <1 | 60 |
| Example 5 | <0.5 | <0.5 | <3 | <1 | 60 |
| Example 6 | 0.7 | 0.7 | <3 | <1 | 60 |
| Example 7 | <0.5 | <0.5 | <3 | <1 | 60 |
| Comp. Example 1 | 11 | 5 | 7 | <1 | 60 |
| Comp. Example 2 | 5 | 8 | 7 | <1 | 60 |
| Comp. Example 3 | 5 | 30 | 7 | < 1 | Remaining |
| Comp. Example 4 | 5 | 6 | 7 | <1 | Remaining |
| Comp. Example 5 | 10 | 12 | 10 | <1 | 120 |
| Comp. Example 6 | 10 | 15 | 8 | <1 | 120 |
| Comp. Example 7 | 15 | 20 | 17 | <1 | 120 |
| Comp. Example 8 | 10 | 12 | 10 | <1 | Remaining |
| Comp. Example 9 | 9 | 17 | 10 | <1 | Remaining |
| Comp. Example 10 | 12 | 10 | 8 | <1 | 60 |
| Comp. Example 11 | 11 | 9 | 7 | <1 | 60 |
| Comp. Example 12 | 10 | 9 | 8 | <1 | 60 |

As shown in Table 2, the cleaning composition according to embodiments of the present invention had a significantly low etch rate for a metal layer containing copper, cobalt, or tungsten. Specifically, the cleaning composition according to embodiments of the present invention had an etch rate of less than 1 Å/min for the copper and cobalt layers, and less than 3 Å/min for the tungsten layer. That is, the cleaning composition according to embodiments of the present invention was evaluated as having no corrosion or damage to all of these metal layers.

At the same time, it was confirmed that the cleaning composition according to embodiments of the present invention may completely remove the photoresist polymer residues from the surface to be cleaned in a short time. In addition, no re-adsorption of the photoresist polymer residues to the surface to be cleaned was observed even after cleaning was completed.

In addition, the cleaning composition according to embodiments of the present invention had excellent stability of the chemical solution after cleaning.

On the other hand, Comparative Example showed that the etch rate for the above-mentioned metal layer was significantly higher than that of the cleaning composition according to embodiments of the present invention. Specifically, it was confirmed that for Comparative Example 7, the etch rate was 15 Å/min for the copper layer, 20 Å/min for the cobalt layer, and 17 Å/min for the tungsten layer, respectively. In particular, it was confirmed that for Comparative Examples, the difference in the etch rate for the copper layer or the cobalt layer was large.

In addition, it was confirmed that Comparative Examples containing the first corrosion inhibitor or the second corrosion inhibitor according to embodiments of the present invention alone showed that the etch rate for the metal layer was up to 22 times higher (Example 1 vs. Comparative Example 1: Cu etch rate). For the reason described above, Comparative Examples 1 and 2 were not applicable to a semiconductor substrate having a metal layer containing copper, cobalt, etc, even though they showed the same level as the Example in the removal effect of polymer residues. In addition, it could be confirmed that when pyrazole is contained as an additive, damage was caused not only to the copper layer but also to the cobalt layer or the tungsten layer, and it took more than twice the time to remove the photoresist polymer residues.

In addition, Comparative Example 3, which satisfies the weak acidity, was not preferable, because sufficient cleaning power for photoresist polymer residues was not exerted and the etch rate for the cobalt layer was significantly increased. In addition, Comparative Examples 8 and 9, which further include an oxidizing agent, also did not exert sufficient cleaning power for photoresist polymer residues.

In addition, Comparative Examples 10 to 12 in which a quaternary organic ammonium salt was used instead of an alkanolamine compound, were not preferable, because all of the etch rates for the metal layer containing copper, cobalt, or tungsten showed high values, and the stability of the chemical solution was significantly reduced after cleaning.

The cleaning composition according to embodiments of the present invention may efficiently remove residues present on these surfaces without damage to the substrate or the semiconductor device including the metal layer containing various metals such as aluminum, titanium, tungsten, copper, cobalt, or the insulating layer containing silicon oxide, etc. Accordingly, the cleaning composition according to embodiments of the present invention is very suitable for the cleaning composition for the substrate or the semiconductor device having a metal layer containing various types of metals and the insulating layer.

In particular, the cleaning composition according to embodiments of the present invention may easily remove photoresist polymer residues of sidewalls and bottoms that have been altered and cured by dry etching, wet etching, or an asking process in a wiring forming process, a via hole pattern forming process, and other pattern forming processes, in a short time, and may minimize corrosion, undercuts, whiskers, pitching, notching, etc., of an underlying metal layer. In addition, the cleaning composition according to embodiments of the present invention may prevent the cleaned residues from redepositing on the surface of the substrate or the semiconductor device.

Therefore, according to embodiments of the present invention, it is possible to effectively clean the object to be cleaned to improve the process yield of the subsequent process, thereby providing a highly reliable semiconductor device in a very economical way.

It will be obvious to those skilled in the art to which the present invention pertains that the present invention is not limited to the above-mentioned embodiments and Examples, but may be variously substituted, modified, and altered without departing from the scope and spirit of the present invention.

What is claimed is:

1. A cleaning composition comprising: water; a fluorine compound; an alkanolamine compound; and a corrosion inhibitor, wherein the corrosion inhibitor is a mixture of a first corrosion inhibitor represented by the following Formula 1 and a second corrosion inhibitor represented by the following Formula 2, wherein the corrosion inhibitor is a mixture mixed with 0.1 to 10 parts by weight of the second corrosion inhibitor, based on 1 part by weight of the first corrosion inhibitor:

[Formula 1]

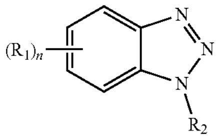

[Formula 2]

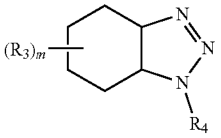

wherein:

$R_1$ and $R_3$ are each independently halogen, amino, hydroxy, cyano, nitro, a carboxyl group, $C_{1-20}$ alkoxy, $C_{1-20}$ alkyl, or $C_{1-20}$ aminoalkyl;

$R_2$ and $R_4$ are each independently hydrogen or $C_{1-20}$ alkyl; and n and m are each independently an integer selected from 0 to 4.

2. The cleaning composition of claim 1, wherein in Formulas 1 and 2, $R_1$ and $R_3$ are each independently halogen, amino, hydroxy, cyano, nitro, a carboxyl group, $C_{1-7}$ alkoxy, $C_{1-7}$ alkyl, or $C_{2-7}$ aminoalkyl; $R_2$ and $R_4$ are each independently hydrogen or $C_{1-7}$ alkyl; and n and m are each independently an integer of 0 or 1.

3. The cleaning composition of claim 1, wherein in Formulas 1 and 2, $R_1$ and $R_3$ are each independently $C_{1-7}$ alkyl; $R_2$ and $R_4$ are each independently hydrogen or $C_{1-7}$ alkyl; and n and m are integers of 1.

4. The cleaning composition of claim 1, wherein the cleaning composition has a pH of 7 to 14.

5. The cleaning composition of claim 1, wherein the cleaning composition is for removing post-etch or post-ash residues from a substrate used in the semiconductor industry.

6. The cleaning composition of claim 5, wherein the residues are selected from the group consisting of a polymer compound, an aluminum-containing compound, a copper-containing compound, a tungsten-containing compound, a cobalt-containing compound, a titanium-containing compound, and combinations thereof.

7. The cleaning composition of claim 1, wherein the fluorine compound comprises ammonium fluoride.

8. A cleaning method of a semiconductor substrate, comprising a cleaning step of bringing the cleaning composition of claim 1 into contact with a surface of the substrate on which post-etch or post-ash residues are present.

9. A cleaning method of a semiconductor substrate, comprising a cleaning step of bringing the cleaning composition of claim 1 into contact with a surface of the substrate on which photoresist polymer residues are present.

10. The cleaning method of claim 8, wherein the cleaning step is performed in a range of 25 to 70° C.

11. The cleaning method of claim 9, wherein the cleaning step is performed in a range of 25 to 70° C.

12. The cleaning method of claim 8, wherein the substrate comprises a metal layer comprising a metal selected from the group consisting of aluminum (Al), copper (Cu), tungsten (W), cobalt (Co), and titanium (Ti).

13. The cleaning method of claim 9, wherein the substrate comprises a metal layer comprising a metal selected from the group consisting of aluminum (Al), copper (Cu), tungsten (W), cobalt (Co), and titanium (Ti).

14. A method of manufacturing a semiconductor device, comprising the cleaning method of a semiconductor substrate of claim 8.

15. A method of manufacturing a semiconductor device, comprising the cleaning method of a semiconductor substrate of claim 9.

* * * * *